United States Patent [19]

Meyer

[11] 4,205,221
[45] May 27, 1980

[54] ELECTRICALLY HEATED SOLDERING TOOL HAVING WORK GRIPPING JAWS

[76] Inventor: Hugo G. Meyer, 312 Main St., Elk River, Minn. 55330

[21] Appl. No.: 909,792

[22] Filed: May 26, 1978

[51] Int. Cl.² ............................ B23K 3/04; H05B 1/00
[52] U.S. Cl. ........................................ 219/230; 165/61; 219/85 D; 219/238; 219/240; 219/373; 219/535; 228/55
[58] Field of Search ................. 219/221, 225, 227–231, 219/235–240, 243, 533, 373, 85 R, 85 D, 535; 228/51–55; 30/140; 81/9.5 R, 9.5 B; 165/61, 57

[56] References Cited

U.S. PATENT DOCUMENTS

| | | | |
|---|---|---|---|
| 1,845,475 | 2/1932 | Benson | 219/231 |
| 2,001,538 | 5/1935 | Mueller et al. | 219/230 X |
| 2,251,557 | 8/1941 | Weston | 219/230 |
| 2,751,485 | 6/1956 | Sauer | 219/230 X |
| 3,023,295 | 2/1962 | Johnson | 219/240 X |
| 3,412,233 | 11/1968 | Wilkie | 219/230 |

FOREIGN PATENT DOCUMENTS

| | | | |
|---|---|---|---|
| 987604 | 4/1951 | France | 219/230 |
| 1065401 | 1/1954 | France | 219/225 |
| 1122645 | 5/1956 | France | 219/230 |
| 480374 | 2/1938 | United Kingdom | 219/230 |
| 1085972 | 10/1967 | United Kingdom | 219/228 |

*Primary Examiner*—A. Bartis

[57] ABSTRACT

An electrically heated soldering tool for gripping and heating joints that are to be soldered together, includes a pistol-grip case having a stationary upper jaw and a pivotable lower jaw extending from the front end thereof. The jaws have confronting portions shaped to closely grip the work and are each provided with an electric heating element for heating the confronting portions of the jaws. The jaws are detachably secured to the case by prong and socket connections. An air duct in each jaw communicates with air outlet openings in the confronting portion of the jaw and a motor-driven fan is provided in the case for selectively directing air through the ducts and outlet openings, whereby, dependent on whether or not the heating elements are energized, either heated air or cool air can be directed against the work to heat or cool the work.

3 Claims, 8 Drawing Figures

U.S. Patent
May 27, 1980
4,205,221
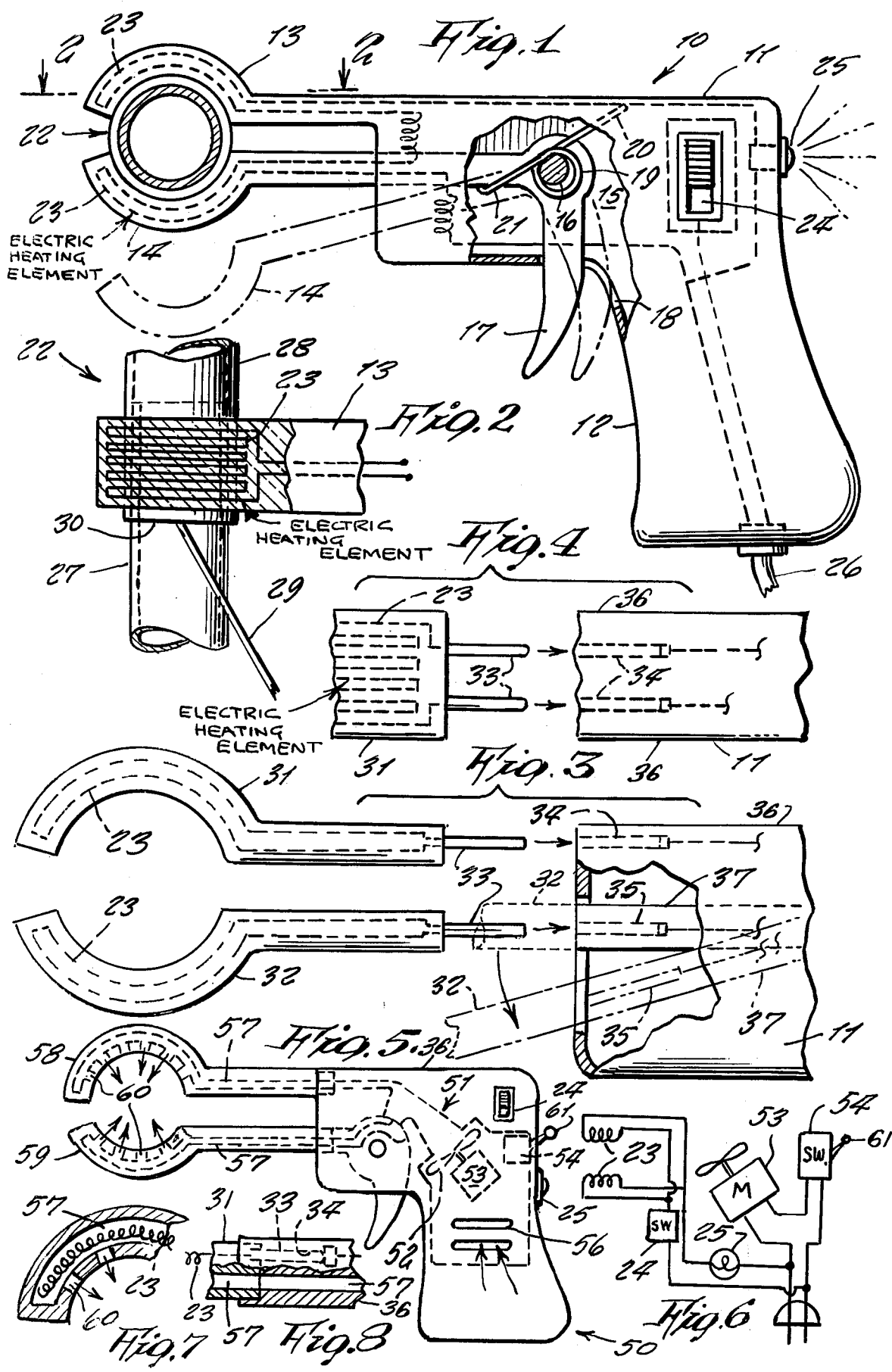

ELECTRICALLY HEATED SOLDERING TOOL HAVING WORK GRIPPING JAWS

This invention relates generally to electrical tools.

In summary, a new electric heat gun is herewith presented, and which is of pistol-type. It includes a case having a portion thereof formed into a handle for being held in a person's hand. It also includes an upper stationary jaw secured to the case and extending from its front end, while a lower jaw is pivotable toward or away from the upper jaw, the lower jaw likewise extending from the case front end, and arranged in juxtaposed relation to the other jaw, so as to clamp objects therebetween. A trigger-like lever protrudes from the case, and is positioned relative to the handle, so as to be squeezed by an operator's hand around the handle. This lever is connected to the lower jaw, so as to pivot it. An electric heating element is within the interior of each of the jaws, and they are in a circuit with an on-off switch and a lamp, supported on the case, the circuit including an extension cord extending outwardly of the case, and having a plug on its end for connection to a household electric outlet socket. The jaws are generally semi-cylindrical in shape, so that, together, they wrap around, and grasp a cylindrical pipe, when the jaws are brought together, for heating up the pipe. Each jaw is interchangeably removable from the case, by means of a pair of jack-like prongs insertable into jack-like sockets. The prongs are electrically connected to the heating elements. One of the sockets is integral with the case, while the other socket is on an end of an arm integral with the triggerlike lever. The electric heat gun also includes a separately controlled, forced air draft system for cooling a work, this system including a switch operated, motor-driven fan blowing fresh air through air ducts extending into the jaws and outwardly of radially inwardly openings toward the work held by the jaws, the heating elements being contained inside the ducts of the jaws, and the motor and fan being contained inside the case handle where a plurality of vent openings through the handle wall admits the fresh air to the fan.

A principal object of the present invention is to provide an electric heat gun, which is designed to grip and to heat joints, that are intended to be soldered together.

Another object of the present invention is to provide an electric heat gun, which is designed particularly for soldering copper fittings.

Still another object is to provide an electric heat gun, which eliminates the necessity of utilizing heat torches.

Still a further object is to provide an electric heat gun, which may be made either in different sizes, or which may be made with interchangeable jaws, so that the tool can be used for different sized work.

Still a further object is to provide an electric heat gun, which, in a modified design thereof, includes forced air draft, so as to more readily transfer heat to the work when so wished, or to cool a work after having been heated.

Still a further object is to provide an electric heat gun, which is simple in design, inexpensive to manufacture, rugged in construction, easy to use and efficient in operation.

These, and other objects, will be readily evident, upon a study of the following specification, and the accompanying drawing, wherein:

FIG. 1 is a side elevation view, shown partly broken away, and illustrating the soldering gun in operative use;

FIG. 2 is a fragmentary plan view thereof, shown partly in cross-section, so as to illustrate the heating element;

FIG. 3 is a fragmentary side elevation view of a modified design of the gun, in which the heating jaws are plugged in for purposes of interchangeability;

FIG. 4 is a plan view thereof, showing the heater element circuit for each jaw;

FIG. 5 is a side elevation view, showing a modified design of the invention, which includes forced draft means;

FIG. 6 is an electric circuit of the gun shown in FIG. 5;

FIG. 7 is a fragmentary cross-sectional view of the upper jaw shown in FIG. 5, and FIG. 8 is an enlarged cross-section of a typical jaw and case connection shown in FIG. 5.

Referring now to the drawing in greater detail, and more particularly to FIGS. 1 through 4 thereof, at this time, the reference numeral 10 represents an electric heat gun, according to the present invention, wherein there is a pistol-shaped case 11, that includes a handle 12, for being gripped within an operator's hand, while the tool is in use.

As shown in FIGS. 1 and 2, one form of the electric heat gun includes a stationary jaw 13, that is integral with the case 11 and which cooperates with a pivotable heating jaw 14, that extends through a front opening of the case into the interior 15 thereof, where it is pivotable about a transverse pivot pin 16 supported in the case. The pivotable jaw 14 is also integral with a trigger-like lever 17, that protrudes outwardly of a bottom opening 18 of the case, so that it may be conveniently squeezed by an operator's finger, while he is holding the handle 12. A tension coil spring 19, wound around the pin 16, has one end 20 thereof bearing against the case wall, and the opposite end 21 of the spring bearing against one side of the pivotable jaw 14, so as to normally urge the jaw toward the stationary jaw 13, in order that a work 22 can be firmly grasped between the jaws.

As shown in FIG. 1, it is to be noted that each of the jaws may have a particular shape, so as to suit the configuration of the work 22. In the form illustrated, the confronting portions of each of the jaws is of semi-cylindrical shape, so that a cylindrical fitting 22 can be grasped therebetween.

Each of the jaws 13 and 14 contain a heating element 23, which extends into the interior chamber 15 of the case 11, where they are in an electric circuit with an on-off switch 24, and an indicator lamp 25, which accordingly are in a series circuit with the heating elements. The electric circuit also extends through the extension cord 26, outwardly of a lower end of the handle 12, and the outward end of the extension cord is fitted with a convenient male plug, so that it may be inserted into a household electric outlet socket.

In operative use, as shown in FIG. 2, the work 22 may comprise a pair of interfitting copper pipes or tubes 27 and 28, which are held, as shown, by the jaws, so that the pipes may be heated sufficiently, in order that a solder 29 will melt, when applied on the seam joint 30 between the pipes.

Reference is now made to FIGS. 3 and 4 of the drawing, where in a modified design of the above invention, the same incorporates a means whereby the jaws are removable from the case, in order that they may be interchanged with other jaws of different sizes or shapes, so as to suit different works to be held therebetween.

Thus, in this form of the invention, each interchangeable set of jaws comprises a pair of jaws 31 and 32, each of which has a jack plug end 33, for being slide-fitted into a jack socket 34 or 35, one of which is stationarily formed upon the case 36, and the other of which is formed upon a pivotable arm 37, that pivots about the above described pivot pin 16, and which is integral with trigger-like lever 17. Thus, in this form of the invention, the jaws can be of any varied size, or of any shape.

Reference is now made to FIG. 5 of the drawing, wherein there is another modified design of electric heat gun 50, that is generally similar to the above described electric heat gun 10, but which, additionally, includes a forced air draft system 51. This system includes a fan 52, driven by an electric motor 53, and which is in an electric circuit with a switch 54, all of which are contained within the case 55. The case includes vent openings 56, so that air can be drawn into the case by the fan, and then blown into a duct 57, leading to both of the jaws 58 and 59. Within each of these jaws, these ducts communicate with radially inwardly extending outlets 60, so as to blow air directly at the surface of the work that is clamped between the jaws.

In operative use, it is now evident that, when the switch button 61 is flipped, forced air is moved through the jaws against the surface of the work. If the heater elements 23 are energized by switch 24 at such time, the air thus forced against the work will be a heated air, so that the work will thus heat up much faster, and to a greater intensity. Thus, time will be saved in heating up the work, and the soldering operation can be commenced much sooner. Likewise, after a soldering operation is completed, the forced air system can be used alone, without the heater, in order to cool off a soldered joint, so that it can be comfortably handled, without burning a person's hand.

As shown in FIG. 8, it is to be noted, that the air duct 57, within the butt end of the jaw 32, is alongside the electrical wiring, and the end of this duct abuts against the end of the duct 57 in the case 36, for making communication therewith at the same time when the electrical jack connection is accomplished.

While various changes may be made in the detail construction, it is understood that such changes will be within the spirit and scope of the present invention, as is defined by the appended claims.

What I now claim is:

1. In an electric heat gun, the combination of a case, said case including a pistol-grip handle portion adapted to be held in a person's hand, an upper stationary jaw secured to said case and extending forwardly from a front end thereof, a pivotable lower jaw pivotable toward and away from said upper jaw, said lower jaw being pivotable about a transverse pin supported laterally in said case, said lower jaw extending forwardly from the front end of said case, and arranged in juxtaposed relation to the upper jaw for clamping an object therebetween, a trigger-like lever protruding from said case, and being positioned relative to said handle, for being squeezed by an operator's finger while holding said handle, said trigger-like lever being connected to said pivotable lower jaw for pivoting said pivotable jaw about said pin, heating means associated with each of said jaws for heating said jaws, and means associated with said case for energizing said heating means, said heating means comprising an electric heating element within an interior of each of said jaws, said means for energizing said heating elements comprising an electric circuit extending into an interior of said case, said electric circuit including an on-off switch and an indicator lamp supported by said case, an electric extension cord extending outwardly of said case, and an outer end of said extension cord having a male plug for connection to a household electric socket, and the confronting portions of each said jaws being approximately semi-cylindrical in shape, so that, together, they can grasp around a cylindrical pipe when the pivotable jaw is moved toward the stationary jaw by said lever for heating said pipe; each of said jaws being interchangeably removable from said case, each of said jaws having a pair of jack-like prongs and adapted to be inserted into a jack-like socket, said prongs being electrically connected to said heating element in said jaw and said jack-like socket forming a part of said electric circuit, one of said jack-like sockets being integral with said case, and the other of said jack-like sockets being carried on an arm that is integral with the free end of said trigger-like lever pivotable about said transverse pin; said electric heat gun additionally including a separately controlled forced air draft system that includes a motor-driven fan associated with said case and operated by a manually triggered switch button, an air duct extending from said fan into each of said jaws, and a plurality of radially extending openings on the confronting portion of each jaw and communicating with said air duct for directing air against a surface of a work held by said jaws.

2. The combination as set forth in claim 1 (New), wherein each of said heating elements is contained inside the air duct of said the jaw with which it is associated.

3. The combination as set forth in claim 2, wherein said motor is contained within said case handle, said handle having a plurality of vented openings for admitting external air to said fan.

* * * * *